United States Patent
Inoue

(10) Patent No.: US 10,245,896 B2
(45) Date of Patent: Apr. 2, 2019

(54) PNEUMATIC TIRE

(71) Applicant: SUMITOMO RUBBER INDUSTRIES, LTD., Kobe-shi, Hyogo (JP)

(72) Inventor: Seiji Inoue, Kobe (JP)

(73) Assignee: SUMITOMO RUBBER INDUSTRIES, LTD., Kobe-Shi, Hyogo (JP)

(*) Notice: Subject to any disclaimer, the term of this patent is extended or adjusted under 35 U.S.C. 154(b) by 479 days.

(21) Appl. No.: 14/903,541

(22) PCT Filed: Jul. 4, 2014

(86) PCT No.: PCT/JP2014/067953
§ 371 (c)(1),
(2) Date: Jan. 7, 2016

(87) PCT Pub. No.: WO2015/016005
PCT Pub. Date: Feb. 5, 2015

(65) Prior Publication Data
US 2016/0167443 A1 Jun. 16, 2016

(30) Foreign Application Priority Data
Jul. 29, 2013 (JP) ................. 2013-157005

(51) Int. Cl.
*B60C 11/12* (2006.01)
*B60C 11/03* (2006.01)

(52) U.S. Cl.
CPC ...... *B60C 11/1236* (2013.01); *B60C 11/0304* (2013.01); *B60C 11/0306* (2013.01);
(Continued)

(58) Field of Classification Search
CPC ......... B60C 11/0306; B60C 2011/0386; B60C 2011/1254; B60C 11/0304
See application file for complete search history.

(56) References Cited

U.S. PATENT DOCUMENTS 6,343,636 B1 2/2002 Hanya et al.
2012/0118455 A1* 5/2012 Hada ................... B60C 11/0304
152/209.8
(Continued)

FOREIGN PATENT DOCUMENTS

JP 10-16516 A 1/1998
JP 2004-330812 * 11/2004
(Continued)

OTHER PUBLICATIONS

English machine translation of JP2004-330812. (Year: 2004).*
Extended European Search Report, dated Mar. 14, 2017, for European Application No. 14832055.9.

*Primary Examiner* — Robert C Dye
(74) *Attorney, Agent, or Firm* — Birch, Stewart, Kolasch & Birch, LLP

(57) ABSTRACT

A pneumatic tire is provided with a pair of shoulder lands, and each of the shoulder lands has arranged therein shoulder lug grooves and first sipes. The opposite ends of each of the first sipes terminate within a shoulder land, and the outer end of the first sipe in the axial direction of the tire is located on the inside of a ground contact end of the tread in the width direction of the tire. The sum of the lengths of the first sipes provided in the shoulder land located facing the inside of a vehicle when the tire is mounted on the vehicle is greater than the sum of the lengths of the first sipes provided in the shoulder land located facing the outside of the vehicle. The shoulder land located facing the inside of the vehicle is provided with second sipes extending in the circumferential direction of the tire on the inside of the first sipes in the axial direction of the tire.

18 Claims, 5 Drawing Sheets

(52) U.S. Cl.
CPC ...... *B60C 11/0327* (2013.01); *B60C 11/1263* (2013.01); *B60C 2011/0334* (2013.01); *B60C 2011/0341* (2013.01); *B60C 2011/0358* (2013.01); *B60C 2011/0381* (2013.01); *B60C 2011/0388* (2013.01); *B60C 2011/0395* (2013.01); *B60C 2011/1209* (2013.01); *B60C 2011/129* (2013.01); *B60C 2011/1254* (2013.01); *B60C 2011/1295* (2013.01)

(56) References Cited

U.S. PATENT DOCUMENTS

| | | | | |
|---|---|---|---|---|
| 2012/0160385 A1* | 6/2012 | Tanaka | ................ | B60C 11/0306 152/209.22 |
| 2012/0227881 A1* | 9/2012 | Kudo | ................ | B60C 11/0083 152/209.14 |
| 2012/0285592 A1* | 11/2012 | Kameda | ............. | B60C 11/1392 152/209.8 |
| 2013/0118663 A1* | 5/2013 | Kishizoe | ................ | B60C 11/12 152/209.18 |
| 2013/0167996 A1 | 7/2013 | Oda | | |

FOREIGN PATENT DOCUMENTS

| | | |
|---|---|---|
| JP | 2012-101758 A | 5/2012 |
| JP | 2012-218650 A | 11/2012 |
| JP | 2012-236455 A | 12/2012 |
| JP | 2013-139194 A | 7/2013 |

\* cited by examiner

PNEUMATIC TIRE

TECHNICAL FIELD

The present invention relates to a pneumatic tire capable of improving ride comfort while ensuring steering stability.

BACKGROUND ART

A pneumatic tire including a tread portion having a left-right asymmetry pattern and a direction to install on a vehicle has been proposed. Such a pneumatic tire can offer a different feature on the respective inboard and outboard of the tread portion.

For instance, the following patent literature 1 discloses a pneumatic tire having an asymmetry pattern in which widths of land portions and lengths of lateral grooves are improved. Specifically, in the tire disclosed by the following patent literature 1, a length of a lateral groove (inboard slot) provided on the inboard middle portion is smaller than that of a lateral groove (outboard slot) provided on the outboard middle portion. Thus, steering stability and drainage performance of the tire may be balanced.

CITATION LIST

Patent Literature

Patent literature 1: Japanese Unexamined Patent Application Publication No. 2012-218650

SUMMARY OF INVENTION

Technical Problem

Unfortunately, the tire disclosed by the patent literature 1 has a problem to be solved that ride comfort tends to deteriorate due to relatively high rigidity of the inboard middle portion.

The present invention has an object to provide a pneumatic tire capable of improving ride comfort while ensuring steering stability based on an improvement of sipe lengths provided on shoulder portions or the like.

Solution to Problem

The present invention provides a pneumatic tire including a tread portion being provided with a circumferentially and continuously extending central main groove on each side of a tire equator to form a pair of shoulder portions each dispose axially outward of each central main groove wherein the tread portion having a direction to install on a vehicle. The shoulder portions includes an outboard shoulder portion to be located on outboard of the vehicle when the tire is installed to the vehicle and an inboard shoulder portion to be located on inboard of the vehicle when the tire is installed to the vehicle. Each of the shoulder portions is provided with a plurality of shoulder lug grooves each extending axially inwardly from each tread edge and terminating within the shoulder portion and a plurality of axially extending first sipes each arranged between a pair of circumferentially adjacent shoulder lug grooves. Each of the first sipe has an axially inner and an outer end each of which terminates within the shoulder portion and the axially outer end located axially inward of the tread edge. A total sum $\Sigma$ Lai of lengths of the first sipes provided on the inboard shoulder portion is greater than a total sum $\Sigma$ Lao of lengths of the first sipes provided on the outboard shoulder portion. The inboard shoulder portion is provided with a circumferentially extending second sipe located axially inward of the first sipes.

In another aspect of the pneumatic tire in accordance with the present invention, preferably, each of the first sipes has an axial length in a range of from 0.15 to 0.25 times a tread width which is an axial distance between the tread edges.

In another aspect of the pneumatic tire in accordance with the present invention, preferably, each of the shoulder portions is provided with a plurality of third sipes each extending from an axially inner end of each shoulder lug groove to the central main groove.

In another aspect of the pneumatic tire in accordance with the present invention, preferably, each of the second sipes is arranged between a pair of circumferentially adjacent third sipes and terminates without reaching the third sipes.

In another aspect of the pneumatic tire in accordance with the present invention, preferably, each of the shoulder lug grooves have an axially inner end portion inclined at an angle with respect to an axial direction of the tire.

In another aspect of the pneumatic tire in accordance with the present invention, preferably, a number of the first sipes provided on the inboard shoulder portion is greater than a number of the first sipes provided on the outboard shoulder portion.

In another aspect of the pneumatic tire in accordance with the present invention, preferably, the tread portion includes a central portion between a pair of central main grooves, and the central portion is formed as a rib that is not provided with a groove having a width of more than 1.5 mm.

Advantageous Effects of Invention

The shoulder portions of the pneumatic tire in accordance with the present invention are provided with a plurality of shoulder lug grooves each extending inwardly from each tread edge axially and terminating within the shoulder portion and the plurality of axially extending first sipes each arranged between a pair of circumferentially adjacent shoulder lug grooves. With this, rigidity of an axially inner portion of the shoulder portions are ensured so that steering stability is ensured.

Each of the first sipes has an axially inner end and an outer end each of which terminates within the respective shoulder portions so that the axially outer end is located axially inwardly of the tread edge. Since the both ends of the first sipes do not communicate with the central main groove and the tread edge, rigidity of the shoulder portion may be ensured. Thus, an excellent steering stability may be achieved.

The total sum $\Sigma$ Lai of lengths of the first sipes provided on the inboard shoulder portion is greater than the total sum $\Sigma$ Lao of lengths of the first sipes provided on the outboard shoulder portion. Accordingly, rigidity of the inboard shoulder portion which is subjected to large contact pressure is reduced, and thereby improving ride comfort.

The inboard shoulder portion is provided with the circumferentially extending second sipe located axially inward of the first sipes. The second sipe may open widely rather than an axially extending sipe so as to moderate rigidity of the inboard shoulder portion when coming into contact with the road. Accordingly, an excellent ride comfort may be achieved.

As described above, the pneumatic tire in accordance with the present invention may improve ride comfort while ensuring steering stability.

DESCRIPTION OF EMBODIMENTS

Figure 1:
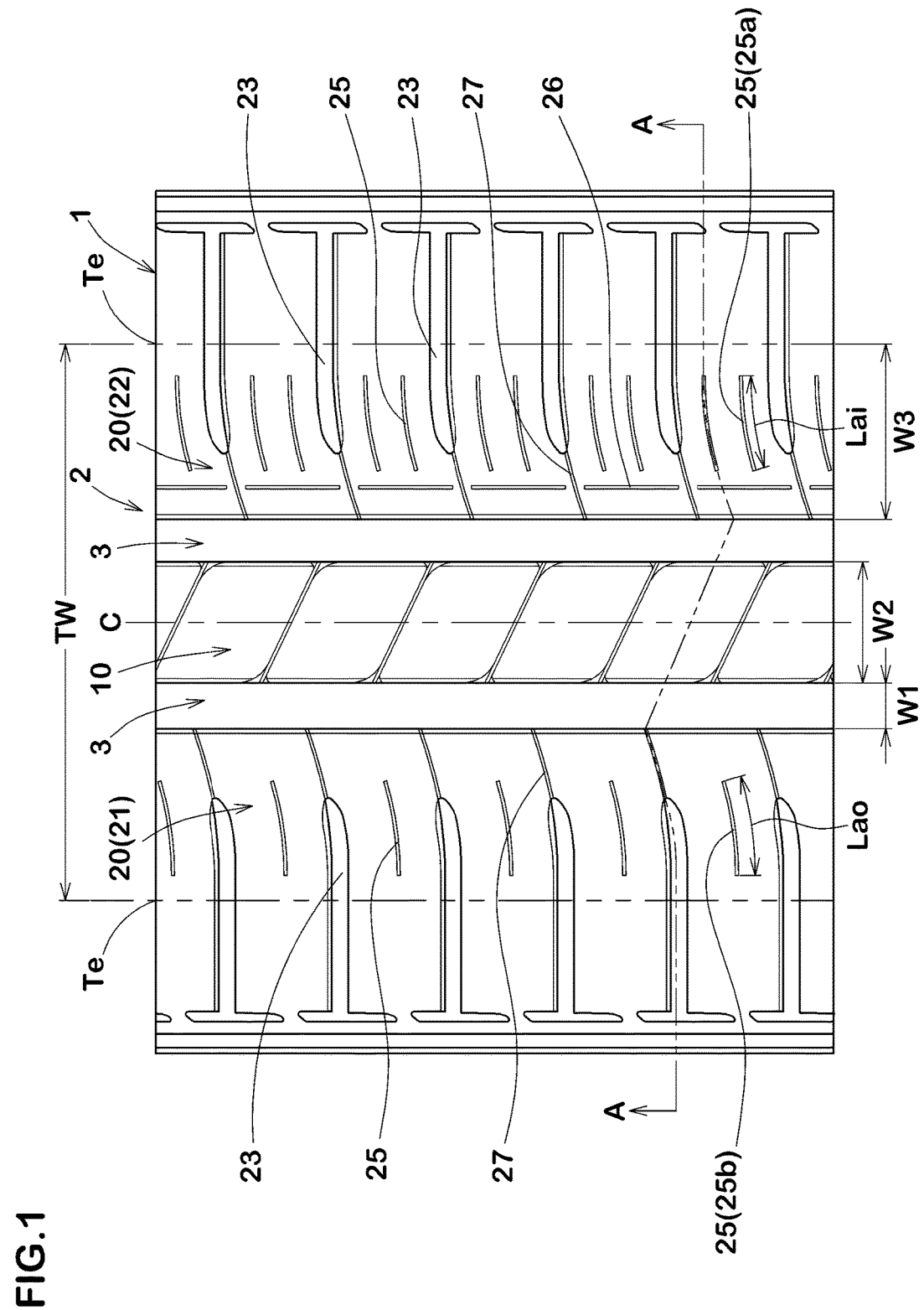
FIG. 1 is a development view of a tread portion of a pneumatic tire in accordance with an embodiment of the present invention.

An embodiment of the present invention will be explained below with reference to the accompanying drawings. FIG. 1 illustrates a development view of a tread portion 2 of a pneumatic tire (hereinafter, it may be simply referred to as "tire".) 1 in accordance with an embodiment of the present invention. The pneumatic tire 1 in accordance with the present embodiment is a tire having a designated direction to install to a vehicle. In FIG. 1, the left side of the tire 1 corresponds to outboard of the vehicle when the tire 1 is installed to the vehicle. The tire 1 is embodied as a pneumatic radial tire for passenger cars, for example.

As shown in FIG. 1, the tread portion 2 of the tire 1 is provided with a pair of central main grooves 3.

The pair of central main grooves 3 are disposed so that a tire equator C is located therebetween. Each of the central main grooves 3 extends continuously in a circumferential direction of the tire. The central main groove 3 extends in a straight manner with a substantially constant width.

The width W1 of the central main groove 3, for example, is in a range of from 7.0% to 9.0% of the tread width TW. Such a central main groove 3 may exhibit excellent drainage performance while ensuring rigidity of the tread portion 2.

The tread width TW is defined as the axial distance between tread edges Te and Te of the tire 1 under a standard condition. The standard condition is such that the tire 1 is mounted on a standard wheel rim with a standard pressure but loaded with no tire load.

The standard wheel rim is a wheel rim officially approved or recommended for the tire by standards organizations, wherein the standard wheel rim is the "standard rim" specified in JATMA, the "Measuring Rim" in ETRTO, and the "Design Rim" in TRA or the like, for example.

The standard pressure is a standard pressure officially approved or recommended for the tire by standards organizations, wherein the standard pressure is the "maximum air pressure" in JATMA, the "Inflation Pressure" in ETRTO, and the maximum pressure given in the "Tire Load Limits at Various Cold Inflation Pressures" table in TRA or the like, for example.

The tread edge Te refers to an axially outermost edge of the ground contacting patch which occurs under the condition where a standard tire load is further added to the standard condition when the camber angle of the tire is zero.

The standard tire load is a tire load officially approved or recommended for the tire by standards organizations, wherein the standard load is the "maximum load capacity" in JATMA, the "Load Capacity" in ETRTO, and the maximum value given in the above-mentioned table in TRA or the like.

Figure 2:
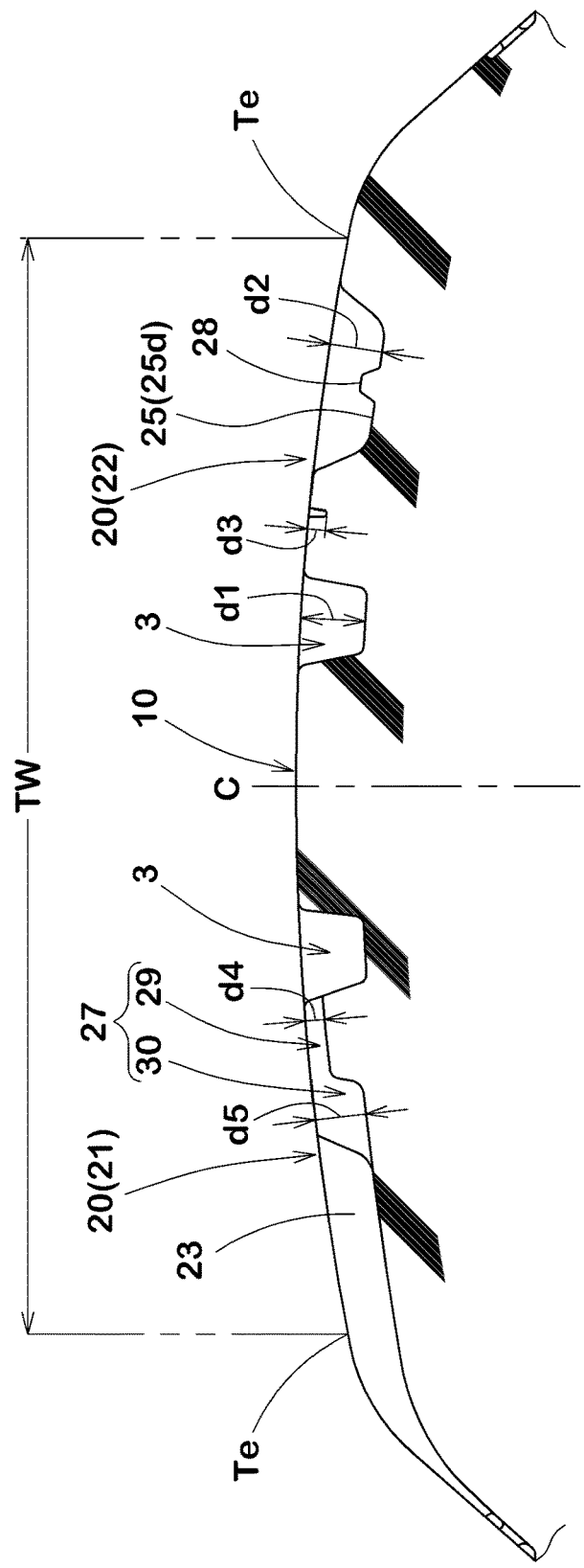
FIG. 2 is a cross-sectional view taken along a line A-A of FIG. 1.

FIG. 2 illustrates a cross-sectional view taken along a line A-A of FIG. 1. As shown in FIG. 2, the depth d1 of the central main groove 3 is in a range of from 6.0 to 8.0 mm, for example.

As shown in FIG. 1, the tread portion 2 is separated into a central portion 10 and a pair of shoulder portions 20 by the central main groove 3.

Figure 3:
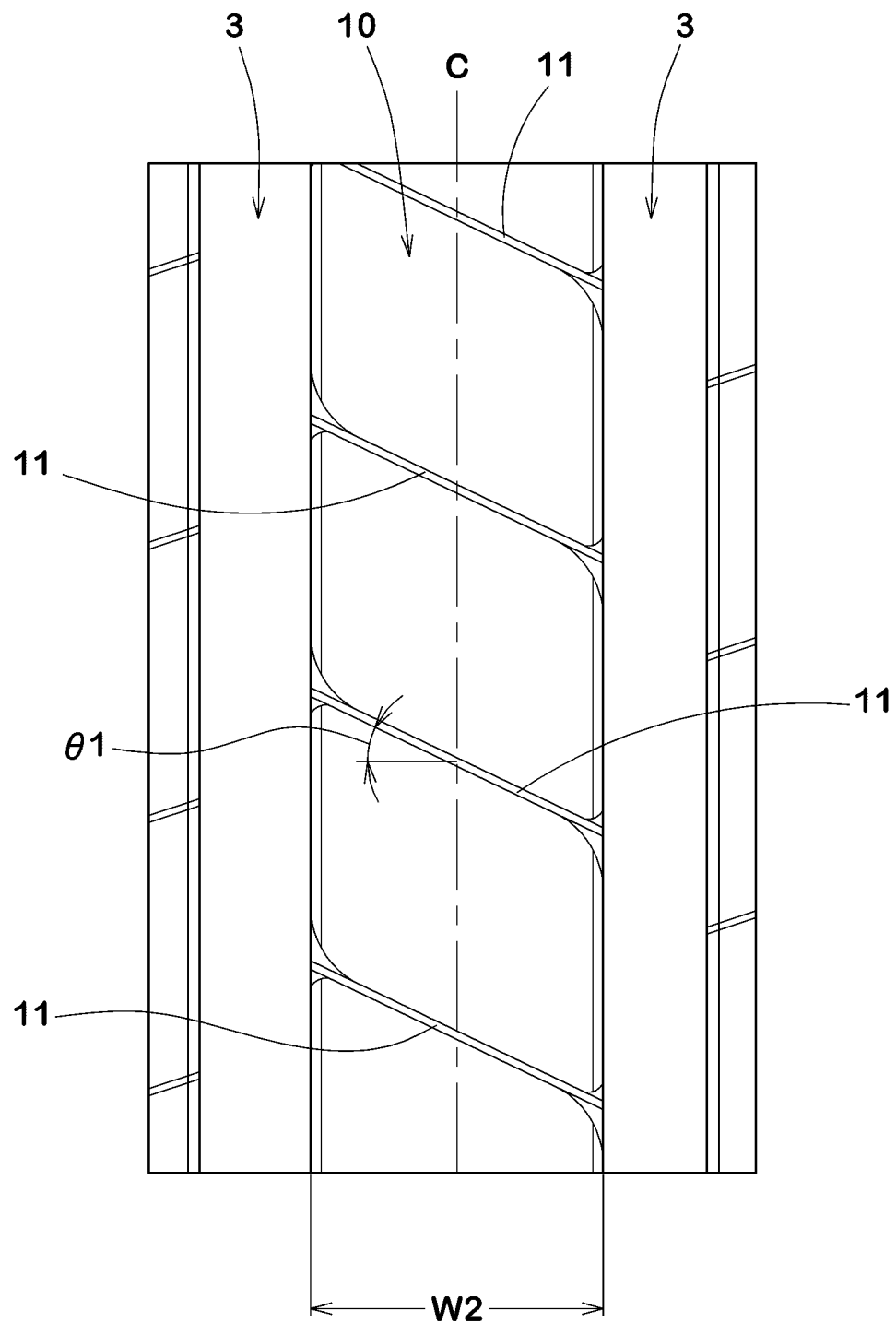
FIG. 3 is an enlarged view of a central portion illustrated in FIG. 1.

FIG. 3 illustrates an enlarged view of the central portion 10. As shown in FIG. 3, the central portion 10 is formed between the pair of central main grooves 3.

Preferably, the central portion 10 has an axial width W2 in a range of not less than 0.18 times, more preferably not less than 0.20 times, but preferably not more than 0.26 times, more preferably not more than 0.24 times the tread width TW (shown in FIG. 1). Such a central portion 10 may be balanced steering stability and ride comfort.

The central portion 10 is provided with a plurality of central sipes 11. In this description, "a sipe" means a narrow cut or slit that has a width of from 0.5 to 1.5 mm, and is distinguished from "a groove" that is disposed to drain mainly. The central portion 10 is formed as a rib shape that is not provided with any grooves having a width of more than 1.5 mm. Such a central portion 10 may ensure rigidity of the tread portion 2, thereby improving initial response to offer excellent steering stability when cornering.

Each of the central sipes connects between the central main grooves 3 and 3. The central sipe 11 extends linearly. The central sipe 11 is inclined at angle with respect to an axial direction of the tire. Preferably, the angle θ1 of the central sipe 11 is in a range of not less than 15 degrees, more preferably not less than 20 degrees, but preferably not more than 35 degrees, more preferably not more than 30 degrees with respect to the axial direction of the tire. Such a central sipe 11 may improve wet performance while ensuring the central portion 10 in rigidity.

As shown in FIG. 1, each of the shoulder portions 20 is located axially outward of each central main groove 3. The shoulder portions 20 include an outboard shoulder portion 21 and an inboard shoulder portion 22. The outboard shoulder portion 21 is located outside the vehicle when the tire is installed to the vehicle. The inboard shoulder portion 22 is located inside the vehicle when the tire is installed to the vehicle. In FIG. 1, the left side shoulder portion 20 corresponds to the outboard shoulder portion 21, and the right side shoulder portion 20 corresponds to the inboard shoulder portion 22. Regarding an arrangement of sipes, the inboard shoulder portion 22 differs from the outboard shoulder portion 21 and is asymmetrical.

Preferably, each of the shoulder portions 20 has an axial width W3 in a range of not less than 0.25 times, more preferably not less than 0.28 times, but preferably not more than 0.35 times, more preferably not more than 0.32 times of the tread width (shown in FIG. 1). Such a shoulder portion 20 may be useful to improve steering stability as well as ride comfort.

The respective shoulder portions 20 (the outboard shoulder portion 21 and the inboard shoulder portion 22) are provided with a plurality of shoulder lug grooves 23 and first sipes 25.

Figure 4:
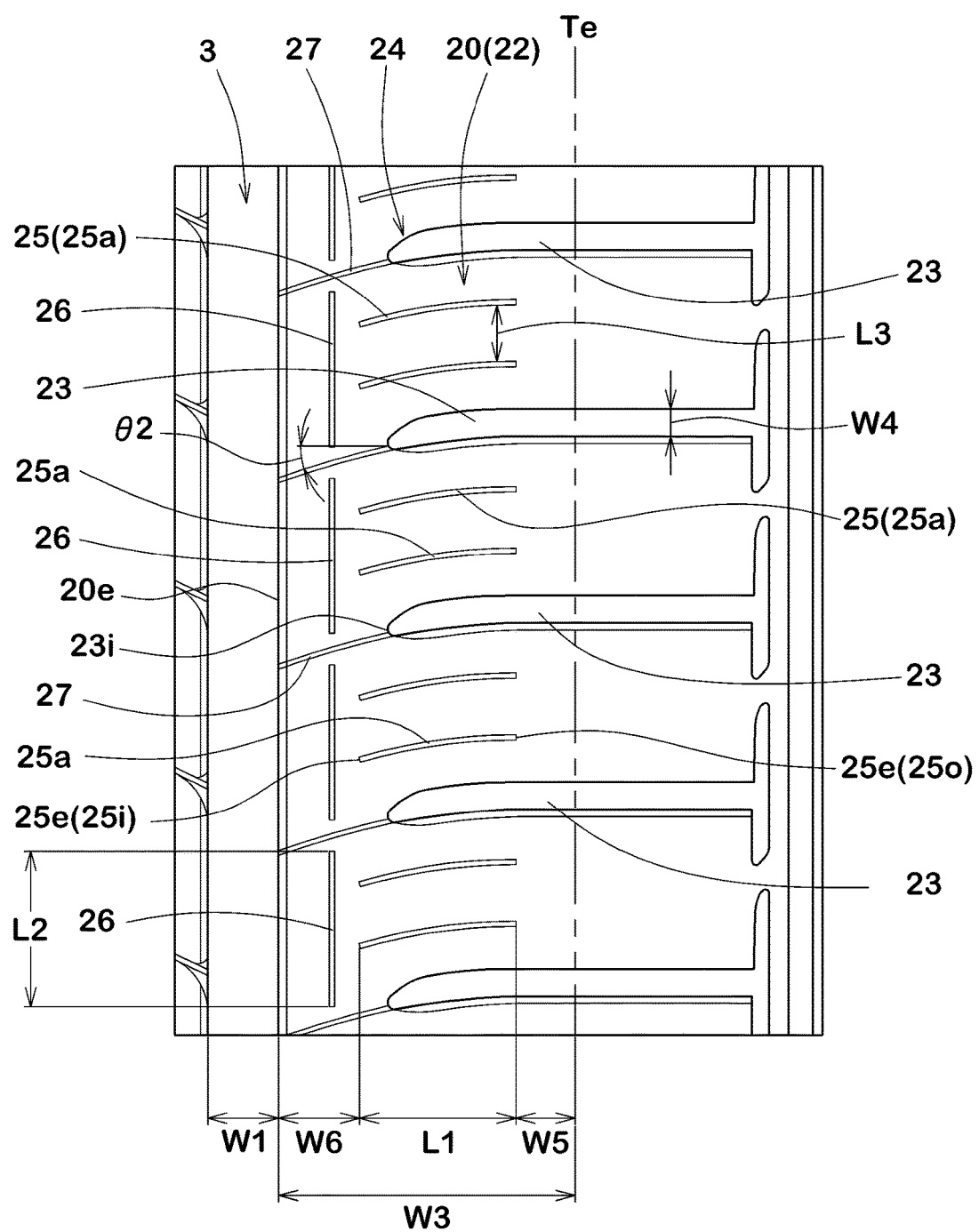
FIG. 4 is an enlarged view of an inboard shoulder portion illustrated in FIG. 1.

FIG. 4 illustrates an enlarged view of the inboard shoulder portion 22 as a representative of the shoulder portion 20.

Each of the shoulder lug grooves 23 extends axially inwardly from at least the location of the tread edge Te. In this embodiment, the shoulder lug groove 23 extends axially inwardly from a location of axially outside the tread edge Te to offer excellent wandering performance as well as drainage performance.

The axially inner end 24 of the shoulder lug groove 23 terminates within the shoulder portion 20. Such a shoulder lug groove 23 may be useful to effectively ensure rigidity of axially inwardly of the shoulder portion 20. This also is useful to improve steering stability.

Preferably, an axially inner end portion 24 of the shoulder lug groove 23, for example, is inclined at an angle with respect to the axial direction of the tire. Such a shoulder lug groove 23 may improve steering stability by ensuring edge effect against the axial direction of the tire when cornering.

The shoulder lug groove 23 has a width W4 in a range of not less than 0.30 times, more preferably not less than 0.33 times, but preferably not more than 0.40 times, more preferably not more than 0.37 times the width W1 of the central main groove 3. Such a shoulder lug groove 23 may improve steering stability as well as ride comfort in a well balanced manner.

Each of the first sipes 25 is provided between a pair of circumferentially adjacent shoulder lug grooves 23. The first sipe 25 extends in the axial direction of the tire. The first sipe 25 includes axially both ends 25e and 25e which terminate within the shoulder portion 20. Furthermore, the axially outer end 25o of the first sipe 25 is located axially inward of the tread edge Te. Since the first sipe 25 has both ends 25e that are not communicated with the central main groove 3 nor the tread edge Te, reduction of rigidity of the shoulder portion 20 may be prevented and thereby excellent steering stability may be achieved.

Preferably, the axial distance W5 between the axially outer end 25o of the first sipe 25 and the tread edge Te is in a range of not less than 0.15 times, more preferably not less than 0.17 times, but preferably not more than 0.23 times, more preferably not more than 0.21 times the axial width W3 of the shoulder portion 20. Such a first sipe 25 may improve wet performance and wandering performance while ensuring steering stability.

Preferably, the axial distance W6 between the axially inner end 25i of the first sipe 25 and the axially inner edge of the shoulder portion 20 is in a range of not less than 0.25 times, more preferably not less than 0.28 times, but preferably not more than 0.35 times, more preferably not more than 0.32 times the axial width W3 of the shoulder portion 20. Such a first sipe 25 may offer excellent steering stability while ensuring wet performance.

Preferably, the axial length L1 of the first sipe 25 is in a range of not less than 0.15 times, more preferably not less than 0.18 times, but preferably not more than 0.25 times, more preferably not more than 0.22 times the tread width TW (shown in FIG. 1). Such a first sipe 25 may improve steering stability as well as ride comfort.

As shown in FIG. 2, the first sipe 25 preferably includes a shallow portion where the bottom surface 25d locally rises upwardly. Such a first sipe 25 may offer steering stability while ensuring rigidity of the shoulder portion 20.

Preferably, the depth d2 of the first sipe 25 is in a range of not less than 0.75 times, more preferably not less than 0.78 times, but preferably not more than 0.85 times, more preferably not more than 0.82 times the depth d1 of the central main groove 3. Such a first sipe 25 may improve steering stability as well as ride comfort.

As shown in FIG. 1, a total sum $\Sigma$ Lai of lengths Lai of the first sipes 25a provided on the inboard shoulder portion 22 is greater than a total sum $\Sigma$ Lao of lengths Lao of the first sipes 25b provided on the outboard shoulder portion 21. Accordingly, rigidity of the inboard shoulder portion 22 which is subjected to large contact pressure is reduced, and thereby improving ride comfort. Furthermore, the impact noise caused by the inboard shoulder portion 22 coming into contact with the road tends to be small, and thereby reducing road noise. In addition, since rigidity of the outboard shoulder portion 21, which is generally subjected to a large load when cornering, relatively becomes large, excellent steering stability may be achieved.

Preferably, the ratio $\Sigma$ Lai/$\Sigma$Lao of the total sum $\Sigma$ Lai of lengths Lai of the first sipes 25a provided on the inboard shoulder portion 22 to the total sum $\Sigma$ Lao of lengths Lao of the first sipes 25b provided on the outboard shoulder portion 21 is in arrange of from not less than 1.5, more preferably not less than 2.0, but preferably not more than 3.0, more preferably not more than 2.5. When the ratio $\Sigma$ Lai/$\Sigma$ Lao is less than 1.5, it may be difficult to improve ride comfort. On the other hand, when the ratio $\Sigma$ Lai/$\Sigma$ Lao is more than 3.0, rigidity difference between the outboard shoulder portion 21 and the inboard shoulder portion 22 tends to be large, and thereby uneven wear may be generated on the inboard shoulder portion 22.

Preferably, the number of first sipes 25a provided on the inboard shoulder portion 22 is greater than the number of first sipes 25b provided on the outboard shoulder portion 21. In this embodiment, the outboard shoulder portion 21 is provided with one first sipe 25b on each space between a pair of circumferentially adjacent shoulder lug grooves 23 and 23. The inboard shoulder portion 22 is provided with two first sipes 25a on each space between a pair of circumferentially adjacent shoulder lug grooves 23 and 23. With this, rigidity of the inboard shoulder portion 22 may be effectively moderated, and thereby excellent ride comfort may be achieved.

In this embodiment, the lengths Lai of the first sipes 25a provided on the inboard shoulder portion 22 is the same as the lengths Lao of the first sipes 25b provided on the outboard shoulder portion 21. Alternatively, the lengths Lai may be greater than the length Lao. In this case, as long as the total sum $\Sigma$ Lai is greater than the total sum $\Sigma$ Lao, the number of first sipes 25a provided on the inboard shoulder portion 22 may be same as the number of first sipes 25b provided on the outboard shoulder portion 21. Even in such a configuration, rigidity of the inboard shoulder portion near the tread edge tends to be reduced, and thereby improving anti-wandering performance.

As shown in FIG. 4, the inboard shoulder portion 22 is provided with a circumferentially extending second sipe 26 which is located axially inwardly of the first sipes 25. The second sipe 26 may open widely more than an axially extending sipe so as to reduce rigidity of the inboard shoulder portion 22 when coming into contact with the road. Accordingly, an excellent ride comfort may be achieved.

The second sipe 26 extends in a straight manner. The second sipe 26 in accordance with the present embodiment extends in parallel with the central main groove 3. Such a second sipe may prevent from uneven wear on a portion between the central main groove 3 and the first sipe 25 by offering uniformly rigidity distribution in the circumferential direction of the tire thereto.

The second sipe 26 terminates without reaching a third sipe 27 described later. The second sipe 26 may improve steering stability by ensuring rigidity of the shoulder portion 20.

Preferably, the second sipe 26 has the circumferential length L2 greater than the space L3 between a pair of circumferentially adjacent first sipes 25 and 25. Such a second sipe 26 may improve ride comfort by effectively moderating rigidity of the inboard shoulder portion 22.

Preferably, the second sipe 26 has the circumferential length L2 being in a range of not less than 2.2 times, more preferably not less than 2.5 times, but preferably not more than 3.1 times, more preferably not more than 2.9 times the space L3. Such a second sipe 26 may improve ride comfort while ensuring steering stability.

As shown in FIG. 2, the second sipe 26 preferably has the depth d3 in a range of not less than 0.15 times, more preferably not less than 0.18 times, but preferably not more than 0.25 times, more preferably not more than 0.22 times the depth d1 of the central main groove 3 in order to improve wet performance while ensuring steering stability.

As shown in FIG. 4, each of the shoulder portions 20 is provided with a plurality of third sipes 27. Each of the third sipe 27 extends from each axially inner end 23i of the shoulder lug groove 23 to the central main groove 3. Such a third sipe 27 may further improve drainage performance while ensuring rigidity of axially inner portion of the shoulder portion 20. Thus, excellent steering stability as well as drainage performance may be offered.

Each third sipe 27 is preferably positioned between the adjacent second sipes 26. In this embodiment, the third sipe 27 and the second sipe 26 are alternately arranged in the circumferential direction of the tire. Thus, rigidity distribution of the inboard shoulder portion 22 may be provided uniformly in the circumferential direction of the tire, and thereby preventing uneven wear on the inboard shoulder portion 22.

The third sipe 27, for example, is inclined in the same direction with respect to the axial direction as the inclined direction of the inner end portion 24 of the shoulder lug groove 23. Preferably, the angle θ2 of the third sipe 27 is in a range of not less than 8 degrees, more preferably not less than 10 degrees, but preferably not more than 14 degrees, more preferably not more than 12 degrees with respect to the axial direction of the tire in order to offer edge effects against the axial direction of the tire so as to further improve wet performance.

As shown in FIG. 2, at least one of the third sipes 27 includes a first portion 29 and a second portion 30. The first portion 29 has substantially constant depth d4. The second portion 30 is located axially outward of the first portion 29 and has a depth d5 greater than the depth d4 of the first portion 29. Such a third sipe 27 may further improve wet performance while ensuring rigidity of the axially inner portion of the shoulder portion 20.

Preferably, the depth ratio d4/d5 of the depth d4 of the first portion 29 to the depth d5 of the second portion 30 is in a range of not less than 0.23, more preferably not less than 0.24, but preferably not more than 0.31, more preferably not more than 0.29. The first portion 29 and the second portion 30 may smoothly be changed rigidity of the shoulder portion 20 to prevent uneven wear of the shoulder portion 20.

Figure 5:
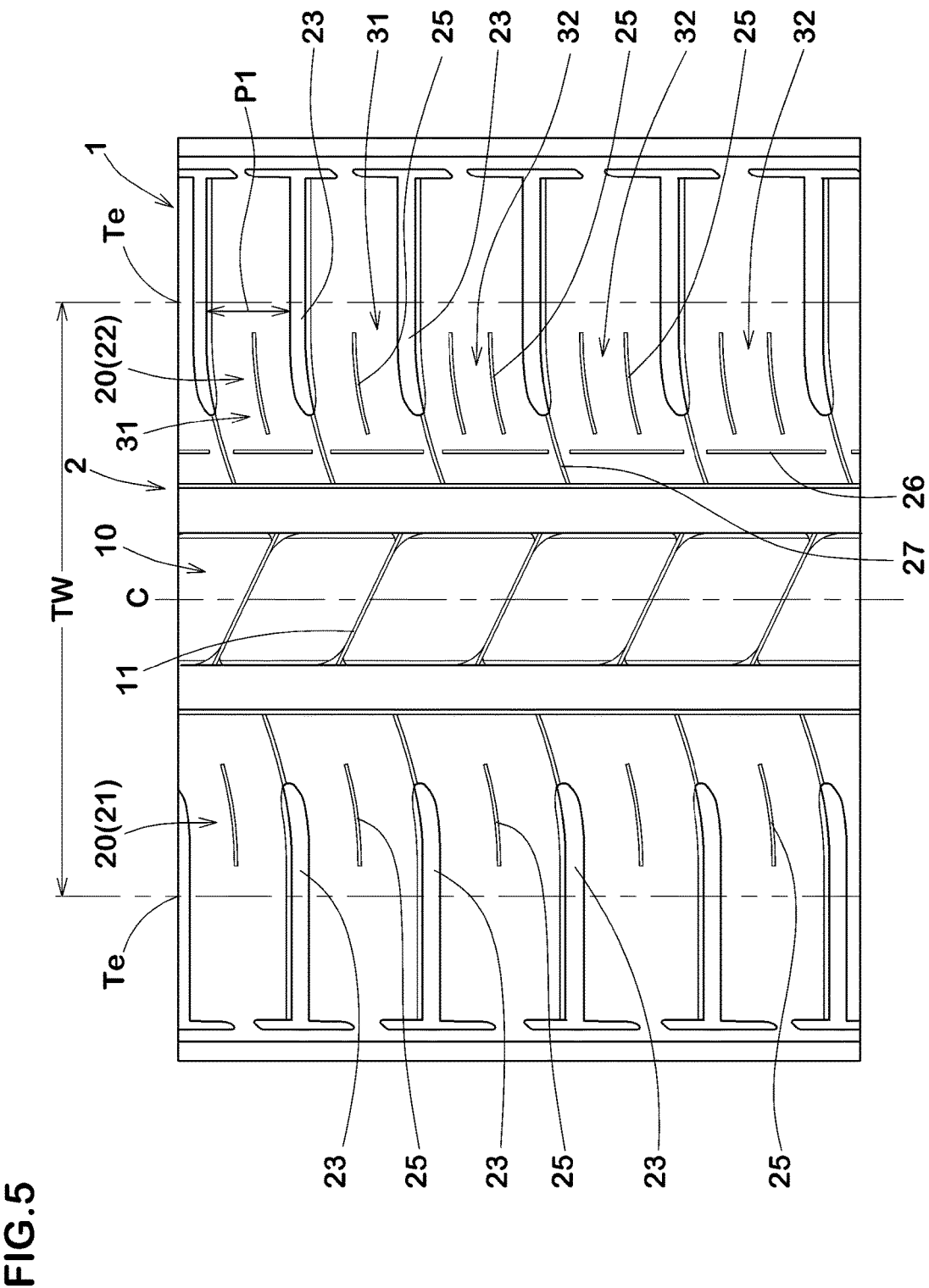
FIG. 5 is a development view of a tread portion in accordance with another embodiment of the invention.

FIG. 5 illustrates a development view of the tread portion 2 in accordance with another embodiment of the invention. The tread portion 2 in accordance with the embodiment as shown in FIG. 5, the shoulder lug grooves 23 are circumferentially arranged with a variable pitch manner that includes plurality kinds of different pitches P1. Such a tread portion 2 may improve road-noise performance by varying audible tones into a pleasant white noise.

In such a tread pattern with the variable pitch manner, the number of first sipes 25 to be arranged between shoulder lug grooves 23 and 23 is preferably adjusted according to the pitch P1 of the shoulder lug grooves 23. In another aspect of the embodiment of the inboard shoulder portion 22 of the tread portion 2, only one first sipe 25 is disposed on a small tread block 31 that is defined between shoulder lug grooves 23 arranged at a relatively small pitch P1. On the other hand, two first sipes 25 are disposed on a large tread block 32 that is defined between shoulder lug grooves 23 arranged at a relatively large pitch P1. Thus, circumferentially rigidity distribution of the inboard shoulder portion 22 may be uniformed. Accordingly, steering stability and ride comfort can be balanced while preventing uneven wear on the inboard shoulder portion 22.

While the particularly preferable embodiments of pneumatic tires in accordance with the invention have been described in detail, the present invention is not limited to the illustrated embodiments, but can be modified and carried out in various aspects.

Example

Pneumatic tires of 175/65R14 having the basic tread pattern as shown in FIG. 1 were manufactured based on the details of Table 1, and then steering stability, ride comfort and road-noise performance thereof were tested. The common specifications and test procedure are as follows.

Rim size: 14×5J

Internal pressure: front 230 kPa/rear 200 kPa

Test vehicle: Front wheel drive vehicle with a 900 kg weight

Tire installing location: All wheels

Steering Stability Performance:

A test driver made to run the test vehicle on an asphalt road of a test course and evaluated the steering stability by his feeling. The test results are indicated using a score based on Ref. 1 being 100. The larger the value, the better the steering stability is.

Ride Comfort Performance:

The test driver made to run the test vehicle on the asphalt road of the test course and evaluated the ride comfort by his feeling. The test results are indicated using a score based on Ref. 1 being 100. The larger the value, the better the rice comfort is.

Road-Noise Performance:

The test vehicle was made to run at a speed of 50 km/h on a road noise measurement road with a rough asphalt road surface, and in-vehicle noise (db(A)) was picked up through a microphone installed near the driver's ear on the window side. The test results are reciprocal number of the noise and are indicating using an index of Ref. 1 being 100. The larger the value, the better the noise performance is.

Test results are provided in Table 1.

TABLE 1

|  | Ref. 1 | Ref. 2 | Ref. 3 | Ref. 4 | Ref. 5 | Ex. 1 | Ex. 2 | Ex. 3 |
| --- | --- | --- | --- | --- | --- | --- | --- | --- |
| Tread pattern | FIG. 1 | FIG. 1 | FIG. 1 | FIG. 1 | FIG. 1 | FIG. 1 | FIG. 1 | FIG. 1 |
| First sipe axial length L1/tread width TW | 0.22 | 0.22 | 0.22 | 0.22 | 0.22 | 0.22 | 0.22 | 0.15 |
| Number of first sipes on outboard shoulder portion | 1 | 2 | 1 | 1 | 1 | 1 | 1 | 1 |

TABLE 1-continued

|  | | | | | | | | |
|---|---|---|---|---|---|---|---|---|
| First sipe length Lao on outboard shoulder portion (mm) | 21.2 | 21.2 | 21.2 | 21.2 | 21.2 | 21.2 | 21.2 | 21.2 |
| Number of first sipes on inboard shoulder portion | 1 | 2 | 2 | 2 | 2 | 2 | 3 | 2 |
| First sipe length Lai on inboard shoulder portion (mm) | 21.2 | 21.2 | 21.2 | 21.2 | 21.2 | 21.2 | 21.2 | 21.2 |
| Ratio Σ Li/Σ Lo | 1 | 1 | 2 | 2 | 2 | 2 | 3 | 2 |
| Distance W5 between outer end of first sipe and tread edge/Shoulder portion width W3 | 0.13 | 0.13 | 0.13 | 0 | 0.13 | 0.13 | 0.13 | 0.13 |
| Distance W6 between inner end of first sipe and tread edge/Shoulder portion width W3 | 0.3 | 0.3 | 0.3 | 0.3 | 0 | 0.3 | 0.3 | 0.3 |
| Second sipe | Presence | Presence | None | Presence | Presence | Presence | Presence | Presence |
| Steering stability (Score) | 100 | 98 | 102 | 98 | 98 | 105 | 104 | 104 |
| Ride comfort (Index) | 100 | 101 | 96 | 102 | 102 | 105 | 107 | 107 |
| Road-noise performance (Index) | 100 | 102 | 99 | 101 | 101 | 100 | 102 | 102 |

|  | Ex. 4 | Ex. 5 | Ex. 6 | Ex. 7 | Ex. 8 | Ex. 9 | Ex. 10 | Ex. 11 |
|---|---|---|---|---|---|---|---|---|
| Tread pattern | FIG. 1 | FIG. 1 | FIG. 1 | FIG. 1 | FIG. 1 | FIG. 1 | FIG. 1 | FIG. 5 |
| First sipe axial length L1/tread width TW | 0.25 | 0.22 | 0.22 | 0.22 | 0.22 | 0.22 | 0.22 | 0.22 |
| Number of first sipes on outboard shoulder portion | 1 | 1 | 1 | 1 | 1 | 1 | 1 | 1 |
| First sipe length Lao on outboard shoulder portion (mm) | 21.2 | 21.2 | 21.2 | 21.2 | 21.2 | 18 | 22 | 21.2 |
| Number of first sipes on inboard shoulder portion | 2 | 2 | 2 | 2 | 2 | 2 | 2 | 2 |
| First sipe length Lai on inboard shoulder portion (mm) | 21.2 | 21.2 | 21.2 | 21.2 | 21.2 | 22 | 18 | 21.2 |
| Ratio Σ Li/Σ Lo | 2 | 2 | 2 | 2 | 2 | 2.4 | 1.6 | 2 |
| Distance W5 between outer end of first sipe and tread edge/Shoulder portion width W3 | 0.13 | 0.1 | 0.12 | 0.14 | 0.16 | 0.13 | 0.13 | 0.13 |
| Distance W6 between inner end of first sipe and tread edge/Shoulder portion width W3 | 0.3 | 0.25 | 0.28 | 0.32 | 0.35 | 0.3 | 0.3 | 0.3 |
| Second sipe | Presence | Presence | Presence | Presence | Presence | Presence | Presence | Presence |
| Steering stability (Score) | 107 | 103 | 104 | 107 | 108 | 105 | 104 | 102 |
| Ride comfort (Index) | 104 | 106 | 106 | 104 | 103 | 107 | 105 | 105 |
| Road-noise performance (Index) | 99 | 101 | 101 | 100 | 99 | 102 | 99 | 104 |

From the test results, it was confirmed that example pneumatic tires had been significantly improved ride comfort while ensuring steering stability.

REFERENCE SIGNS LIST

1 Pneumatic tire
2 Tread portion
3 Central main groove
10 central portion
20 Shoulder portion
21 Outboard shoulder portion
22 Inboard shoulder portion
23 Shoulder lug groove
25 First sipe
26 Second sipe

The invention claimed is:

1. A pneumatic tire comprising:
a tread portion being provided with a circumferentially and continuously extending central main groove on each side of a tire equator to form a pair of shoulder portions each disposed axially outward of each central main groove and a central portion between the central main grooves, the tread portion having a direction to install on a vehicle;
the shoulder portions comprising an outboard shoulder portion to be located on outboard of the vehicle when the tire is installed to the vehicle and an inboard shoulder portion to be located on inboard of the vehicle when the tire is installed to the vehicle;
each of the shoulder portions being provided with a plurality of shoulder lug grooves each extending axially inwardly from each tread edge and terminating within the shoulder portion and a plurality of axially extending first sipes each arranged between a pair of circumferentially adjacent shoulder lug grooves;
the first sipes having an axially inner and an outer end each of which terminates within the shoulder portion and the axially outer end located axially inward of the tread edge;
a total sum Σ Lai of lengths of the first sipes provided on the inboard shoulder portion being greater than a total sum Σ Lao of lengths of the first sipes provided on the outboard shoulder portion;
the inboard shoulder portion being provided with a circumferentially extending second sipe located axially inward of the first sipes; and
the central portion being formed as a rib that is not provided with any grooves having a width of more than 1.5 mm, wherein the central portion is provided with a plurality of central sipes connecting the central main grooves.

2. The pneumatic tire according to claim 1, wherein each of the first sipes has an axial length in a range of from 0.15 to 0.25 times a tread width which is an axial distance between the tread edges.

3. The pneumatic tire according to claim 1, wherein each of the shoulder portions is provided with a plurality of third sipes each extending from an axially inner end of each shoulder lug groove to the central main groove.

4. The pneumatic tire according to claim 3, wherein each of the second sipes is arranged between the pair of circumferentially adjacent third sipes and terminates without reaching the third sipes.

5. The pneumatic tire according to claim 1, wherein each of the shoulder lug grooves have an axially inner end portion inclined at an angle with respect to an axial direction of the tire.

6. The pneumatic tire according to claim 1, wherein a number of the first sipes provided on the inboard shoulder portion is greater than a number of the first sipes provided on the outboard shoulder portion.

7. The pneumatic tire according to claim 1, wherein the plurality of central sipes extends linearly.

8. The pneumatic tire according to claim 7, wherein the plurality of central sipes is inclined at an angle with respect to an axial direction of the tire.

9. The pneumatic tire according to claim 8, wherein the angle is in a range of from 15 to 35 degrees.

10. The pneumatic tire according to claim 7, wherein the plurality of first sipes is inclined with respect to the axial direction of the tire, and wherein the plurality of central sipes is inclined with respect to the axial direction of the tire in an opposite direction to the plurality of first sipes.

11. The pneumatic tire according to claim 7, wherein the tread portion is not provided with any circumferentially and continuously extending main grooves except for the central main grooves.

12. The pneumatic tire according to claim 1, wherein the plurality of central sipes is inclined at an angle with respect to an axial direction of the tire.

13. The pneumatic tire according to claim 12, wherein the angle is in a range of from 15 to 35 degrees.

14. The pneumatic tire according to claim 1, wherein the plurality of first sipes is inclined with respect to the axial direction of the tire, and wherein the plurality of central sipes is inclined with respect to the axial direction of the tire in an opposite direction to the plurality of first sipes.

15. The pneumatic tire according to claim 14, wherein the tread portion is not provided with any circumferentially and continuously extending main grooves except for the central main grooves.

16. The pneumatic tire according to claim 1, wherein a ratio $\Sigma \text{Lai}/\Sigma \text{Lao}$ of the total sum $\Sigma \text{Lai}$ to the total sum $\Sigma \text{Lao}$ is in a range of from 2.4 to 3.0.

17. The pneumatic tire according to claim 1, wherein the tread portion is not provided with any circumferentially and continuously extending main grooves except for the central main grooves.

18. A pneumatic tire comprising:
a tread portion being provided with a circumferentially and continuously extending central main groove on each side of a tire equator to form a pair of shoulder portions each disposed axially outward of each central main groove, the tread portion having a direction to install on a vehicle, wherein the tread portion is not provided with any circumferentially and continuously extending main grooves except for the central main grooves;
the shoulder portions comprising an outboard shoulder portion to be located on outboard of the vehicle when the tire is installed to the vehicle and an inboard shoulder portion to be located on inboard of the vehicle when the tire is installed to the vehicle;
each of the shoulder portions being provided with a plurality of shoulder lug grooves each extending axially inwardly from each tread edge and terminating within the shoulder portion and a plurality of axially extending first sipes each arranged between a pair of circumferentially adjacent shoulder lug grooves;
the first sipes having an axially inner and an outer end each of which terminates within the shoulder portion and the axially outer end located axially inward of the tread edge;
a total sum $\Sigma \text{Lai}$ of lengths of the first sipes provided on the inboard shoulder portion being greater than a total sum $\Sigma \text{Lao}$ of lengths of the first sipes provided on the outboard shoulder portion, wherein a ratio $\Sigma \text{Lai}/\Sigma \text{Lao}$ of the total sum $\Sigma \text{Lai}$ to the total sum $\Sigma \text{Lao}$ is in a range of from 2.4 to 3.0; and
the inboard shoulder portion being provided with a circumferentially extending second sipe located axially inward of the first sipes.

* * * * *